United States Patent

Ueda et al.

[11] Patent Number: 5,880,765
[45] Date of Patent: Mar. 9, 1999

[54] MULTI-BEAM OPTICAL HEAD

[75] Inventors: Kazuhiko Ueda, Kitakatsuragi-gun; Seiichi Nagatome, Tenri, both of Japan

[73] Assignee: Sharp Kabushiki Kaisha, Osaka, Japan

[21] Appl. No.: 471,762

[22] Filed: Jun. 6, 1995

[30] Foreign Application Priority Data

Jul. 4, 1994 [JP] Japan .................................. 6-152486

[51] Int. Cl.$^6$ ................. B41J 2/47; G11B 7/08
[52] U.S. Cl. ............................ 347/234; 347/241
[58] Field of Search ................. 347/248, 256, 347/262, 264, 234, 241; 369/44.26, 44.25, 44.37, 44.38

[56] References Cited

U.S. PATENT DOCUMENTS

| | | | |
|---|---|---|---|
| 3,476,948 | 11/1969 | Mengers | 350/6.5 |
| 4,413,180 | 11/1983 | Libby | 250/236 |
| 4,419,750 | 12/1983 | Howe | 347/248 |
| 4,635,243 | 1/1987 | Tateoka | 369/44 |
| 4,658,389 | 4/1987 | Kuehn | 369/45 |
| 4,815,058 | 3/1989 | Nakamura et al. | 369/45 |
| 4,861,128 | 8/1989 | Ishikawa et al. | 347/246 |
| 4,891,799 | 1/1990 | Nakano | 369/45 |
| 4,962,431 | 10/1990 | Imakawa et al. | 347/256 |
| 4,969,137 | 11/1990 | Sugiyama et al. | 369/32 |
| 5,216,247 | 6/1993 | Wang et al. | 250/236 |
| 5,216,643 | 6/1993 | Berg | 369/13 |
| 5,264,870 | 11/1993 | Egawa | 347/248 |
| 5,267,075 | 11/1993 | Yamaguchi et al. | 359/216 |
| 5,317,552 | 5/1994 | Yamasaki | 369/44 |
| 5,559,766 | 9/1996 | Nakao et al. | 369/44.18 |
| 5,566,150 | 10/1996 | Reno | 369/44.26 |
| 5,574,491 | 11/1996 | Paoli | 347/248 |
| 5,610,754 | 3/1997 | Gheen et al. | 359/210 |

FOREIGN PATENT DOCUMENTS

| | | |
|---|---|---|
| 3339736 C1 | 3/1983 | Germany . |
| 3804701 A1 | 2/1988 | Germany . |
| 61-117744 | 6/1986 | Japan . |
| 62-187366 | 8/1987 | Japan . |
| 1-243247 | 9/1989 | Japan . |
| 6-160728 | 6/1994 | Japan . |

*Primary Examiner*—Safet Metjahic
*Assistant Examiner*—Christopher E. Mahoney
*Attorney, Agent, or Firm*—David G. Conlin; Brian L. Michaelis; David D. Lowry

[57] ABSTRACT

A multi-beam optical head includes a plurality of light sources for emitting a plurality of light beams. An optical system for irradiating the light beams onto the recording surface of a recording medium is included and receives the light beams reflected from the recording medium. The optical system includes a reflecting mirror for directing the light beams emitted from the light sources toward the recording medium; a photodetector for detecting the light beams received by the optical system and for generating electric signals based on the detected light beams; and rotational controller for controlling the reflecting mirror to rotate around an axis which is perpendicular to the recording surface by an amount determined based on the electric signals. The reflecting mirror positions the light beams on tracks on the recording surface of the recording medium. The tracks are tracks on which information is recorded from which the information is reproduced.

4 Claims, 8 Drawing Sheets

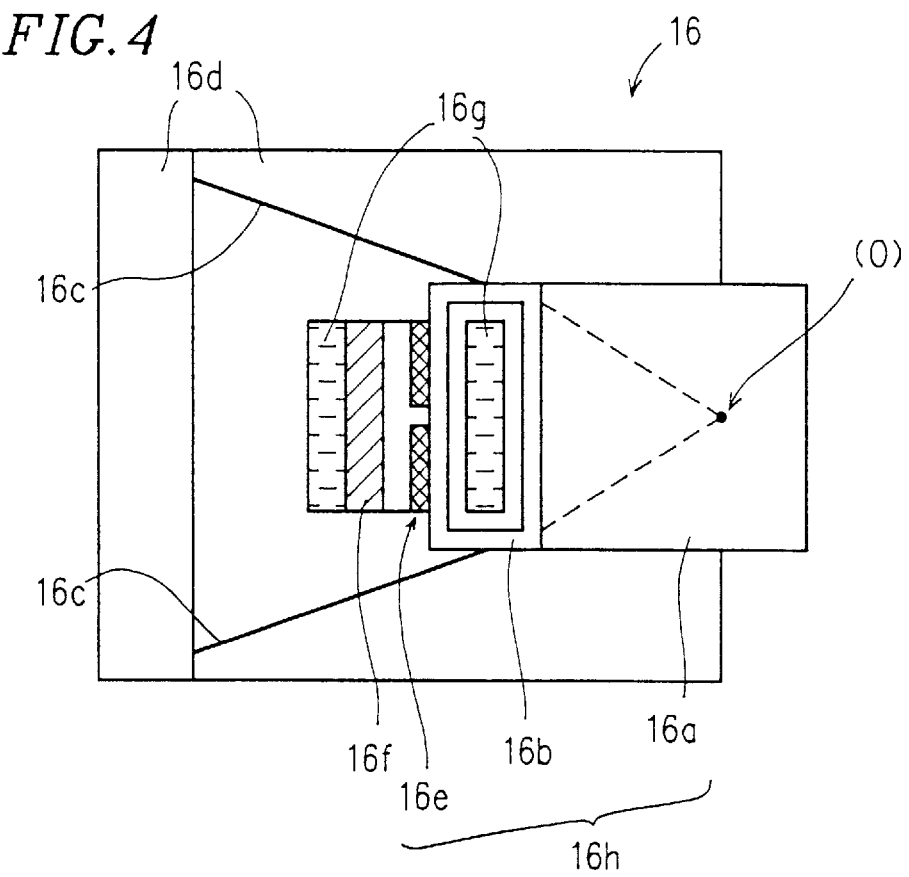

MULTI-BEAM OPTICAL HEAD

BACKGROUND OF THE INVENTION

1. Field of the Invention

The present invention relates to a multi-beam optical head for recording information on a recording medium and/or for reproducing information from the recording medium, by using a plurality of light beams.

2. Description of the Related Art

Conventionally, an optical information recording and reproducing apparatus, such as a magneto-optic disk apparatus, has been utilized for an optical file and an external memory device of a computer, because it has a large storage capacity.

In recent years, using the optical information recording and reproducing apparatus as a memory device in a motion picture system, such as a high-definition TV, has been largely required. In the motion picture system, the memory device needs to have a higher data transmission rate. In order to transmit data at a higher rate, a method for recording the information on a plurality of tracks at one time or for reproducing the information recorded on the tracks in parallel is proposed. In this method, a plurality of light beams are irradiated onto a predetermined number of tracks of the recording medium, and then the information is recorded on and/or reproduced from the irradiated tracks. Hereinafter, the optical information recording and reproducing apparatus using a plurality of light beams is referred to as "a multi-beam optical head."

FIG. 6 schematically shows an exemplary configuration of a conventional multi-beam optical head which is used for a magneto-optic disk. This conventional multi-beam optical head includes three laser diodes as light-emitting devices. The three laser diodes are arranged in a line within a light source 1. As shown in FIG. 6, three light beams emitted from the three laser diodes are collimated by a collimator lens 2, and then enter a shaping prism 3. The shaping prism 3 transforms the distribution of light intensity of each of the three collimated light beams into an approximately round-shaped one. The shaped beams pass through a beam splitter 4 and an image rotatory prism 6 in this order. Then, after being reflected by a reflecting mirror 7 toward a recording medium 5, the shaped beams are converged onto the recording medium 5 by an objective lens 8. In this way, three beams are irradiated onto the recording medium 5 at one time to form three light spots.

A beam spot line constituted by the three light beams irradiated onto the recording medium 5 can be rotated around a rotation axis by rotating the image rotatory prism 6 around this rotation axis by means of a controller (not shown). The rotation axis is parallel to the optical axis of the three light beams.

On the other hand, the three light beams reflected by the recording medium 5 are collimated by the objective lens 8 again; reflected by the reflecting mirror 7; and passed through the image rotatory prism 6 so as to be incident on the beam splitter 4. The reflected light beams are separated from the beams being directed toward the recording medium 5 by the beam splitter 4. Thereafter, each of the beams is split by a Wollaston prism 9 into three light beams having respectively different directions of polarization. Furthermore, the split light beams are directed through a spot lens 10 and a cylindrical lens 11 to a photodetector 12 so as to be optically detected by the photodetector 12.

Based on the detection signal output from the photodetector 12 for detecting these split light beams, a focusing error signal and a tracking error signal are generated in a signal processing circuit (not shown) by an astigmatic method and a push-pull method, respectively.

In accordance with the focus error signal, the position of the objective lens 8 in the direction perpendicular to the recording medium 5 is controlled so as to form focal points on the medium 5. On the other hand, the tracking error signal is used for controlling a positional relationship between the beam spots and the predetermined tracks. The deviation of the three beam spots from the predetermined tracks may occur due to the exchange of the recording medium 5 or the like. In this case, a beam spot line including the beam spots is rotated by rotating the prism 6 based on the tracking error signal so that all of the beam spots are precisely positioned on the predetermined tracks. FIG. 7 illustrates an example in which two spots deviate from the corresponding tracks. In FIG. 7, a beam spot line including three beam spots are at an angle of $\Delta\theta_3$ with the predetermined tracks. By rotating the prism 6, the beam spot line is rotated to be at an angle of $\Delta\theta_2$ with the predetermined tracks, as shown in FIG. 8, so that all of the three beam spots are precisely positioned on the predetermined tracks.

As described above, in the above-mentioned conventional apparatus using multiple beams, the image rotatory prism 6 is required for precisely positioning the beam spots on the predetermined tracks on the recording medium 5, whereas the image rotatory prism 6 is not necessary for an optical head using only one beam. Therefore, the weight of the optical head using multiple beams becomes disadvantageously heavy and the necessary cost increases.

The operation of the image rotatory prism 6 will be described. If the image rotatory prism 6 is rotated around the axis AB parallel to the base of the prism 6 as indicated by the arrow shown in FIG. 9A, then the light beams, e.g., three beams which converged to form three beam spots α, β and γ on the recording medium 5, as shown in FIG. 9C, are rotated so that the beam spots α, β and γ are displaced to the beam spots α', β' (=β) and γ' around the center spot β as shown in FIG. 9B. In this case, it is essential that the respective beams are parallel to the rotation axis AB and a central one of the light beams coincides with the rotation axis AB.

On the other hand, if the light beams are not parallel to the rotation axis AB, or the central beam does not coincide with the rotation axis AB, the center beam spot β may be displaced to the different spot β", as shown in FIG. 9D. As a result, all of the beam spots α, β and γ are moved to the spots α", β" and γ" by rotation.

Therefore, in the multi-beam optical head including the image rotatory prism 6, the above-mentioned control of the positional relationship between the beam spot line consisting of the beam spots and the predetermined tracks can be performed only when the rotation axis AB of the prism 6 is in parallel to the prism 6 itself and the central beam coincides with the rotation axis AB. This makes the arrangement of optical devices in the multi-beam optical head complicated. Also, optical adjustment of the optical devices is made more difficult because the adjustment must be performed with precision. As a result, the weight of whole optical head increases.

SUMMARY OF THE INVENTION

The multi-beam optical head of this invention, includes: a plurality of light sources for emitting a plurality of light beams; an optical system for irradiating the light beams onto a recording surface of a recording medium and for receiving the light beams reflected from the recording medium, the optical system including a reflecting mirror for directing the light beams emitted from the light sources toward the recording medium; light detecting means for detecting the light beams received by the optical system and for generating electric signals based on the detected light beams; and rotational control means for controlling the reflecting mirror to rotate around an axis which is perpendicular to the recording surface by an amount determined based on the electric signals, whereby the reflecting mirror positions the light beams on tracks on the recording surface of the recording medium, the tracks being tracks on which information is recorded or from which the information is reproduced.

In one embodiment of the invention, the axis around which the reflecting mirror rotates coincides with a center axis of a light bundle including the light beams.

In another embodiment of the invention, the rotational control means includes: a fixing member; a pair of leaf springs for fixing the reflecting mirror to the fixing member, one end of each of the leaf springs being connected to the reflecting mirror while the other end of the each of the leaf springs is connected to the fixing member, a distance between the leaf springs being narrower at one end than at the other end; and a driving section for generating a force to rotate the reflecting mirror.

According to the above-described configuration, a reflection surface may be controlled so as to be rotated around the axis vertical to the recording surface of the data recording medium in accordance with the output detected by the photo detector by providing a beam spot line rotatory controller. The rotation of this reflection surface causes the rotation of the respective beam spot lines around the central beam spot. As a result, the tracking error may be corrected, and a plurality of beam spots irradiated onto the data recording medium may be precisely positioned on the predetermined data recording tracks. Therefore, when the beam spot lines are controlled in a rotatory manner, an image rotating prism, which has conventionally been necessary, is no longer required, so that the weight of the apparatus may be reduced. Consequently, a multi-beam optical head may be obtained with a reduced cost.

Specifically, the reflecting mirror operates in the following manner. When a driving portion operates in accordance with the output detected by the photodetecting portion, two leaf springs are deflected so as to rotate the reflecting mirror around the central optical axis of a plurality of beam lines, thereby correcting the tracking error of the plurality of beam spot lines.

Thus, the invention described herein makes possible the advantage of providing a light multi-beam optical head for controlling the positional relationship between a line consisting of beam spots and predetermined tracks without an image rotating prism.

This and other advantages of the present invention will become apparent to those skilled in the art upon reading and understanding the following detailed description with reference to the accompanying figures.

BRIEF DESCRIPTION OF THE DRAWINGS

FIG. 4 is a plan view showing the top portion of the beam spot line rotatory controller shown in FIG. 3B.

FIG. 5A shows the direction of the driving force F with respect to the reflecting mirror. FIG. 5B shows the rotation of the reflection mirror.

DESCRIPTION OF THE PREFERRED EMBODIMENTS

Hereinafter, an example of the present invention will be described with reference to the accompanying drawings.

Figure 1:
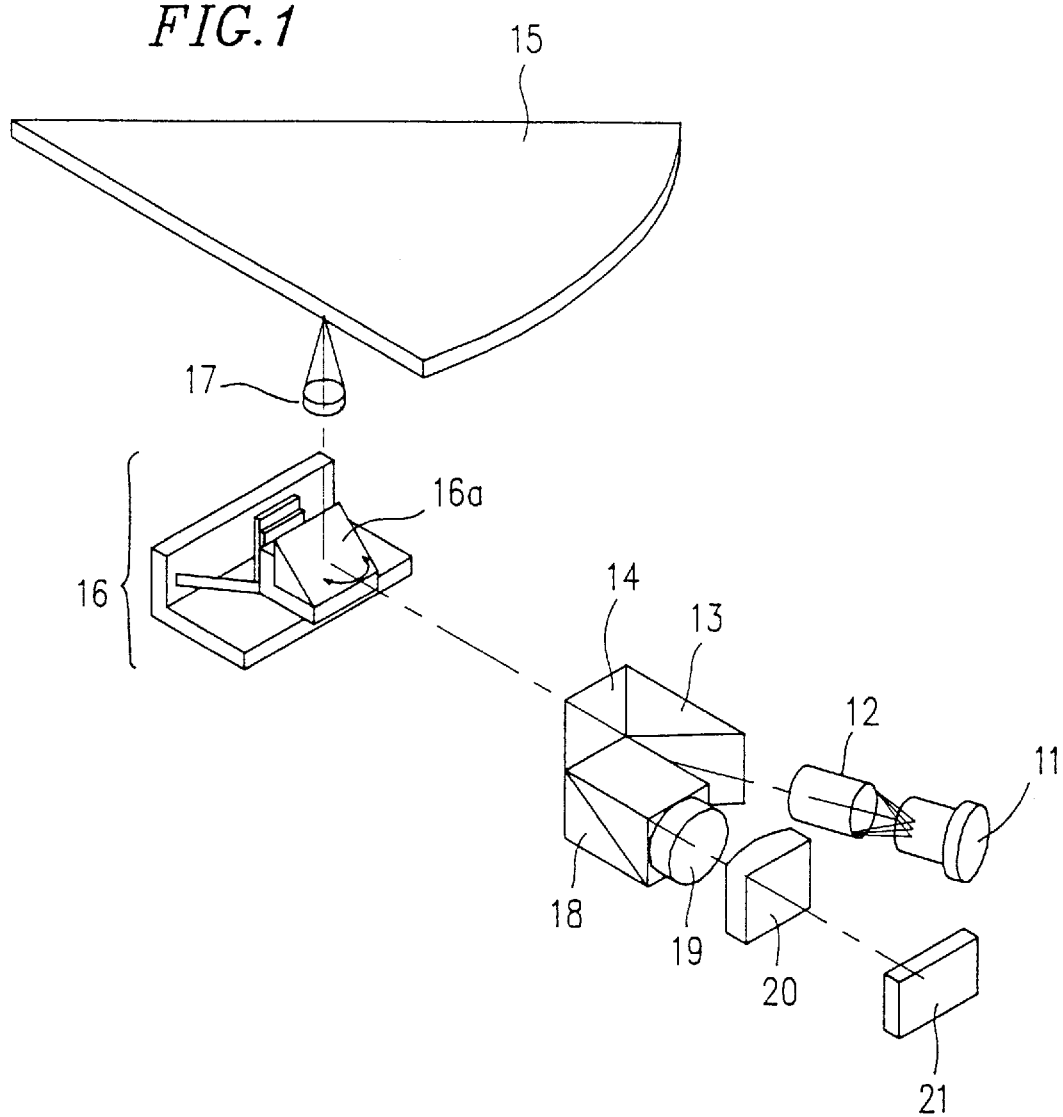
FIG. 1 is a perspective view schematically showing an optical system for a multi-beam optical head according to an example of the present invention.

FIG. 1 is a perspective view schematically showing a multi-beam optical head according to an example of the present invention. In FIG. 1, a light source 11 for emitting three light beams includes three light-emitting devices, e.g., laser diodes monolithically formed or hybrid laser diodes, which are arranged in a single line. The intensities of the three light beams emitted from the light source 11 are controlled by a control circuit (not shown) depending on the type of operations, which is either one of the recording operation, reproducing operation and erasing operation.

The three light beams emitted from the light source 11 are directed toward a collimator lens 12 for collimating the three light beams. The collimated light beams have light intensities distributed in an elliptical shape. By passing through a shaping prism 13, the beams are shaped to have the light intensities distributed in substantially circular shape. The shaped beams are then incident on a beam spitter 14. This beam splitter 14 is used for separating the light beams directed from the light source 11 toward a recording medium 15 from the light beams reflected by the recording medium 15.

The light beams from the beam splitter 14 are incident on a beam spot line rotatory controller 16. Herein, "a beams spot line" means a line in which the light beams are arranged. The beam spot line rotatory controller 16 includes a reflecting mirror 16a for reflecting the light beams toward the recording medium 15. The reflecting mirror 16a bends the optical path of the light beams at right angles. The rotatory controller 16 rotates the reflecting mirror 16a around an axis perpendicular to the recording surface of the recording medium 15 in accordance with a tracking error signal which is applied as one of control signals, so that deviations of the beam spots of the three light beams from three target tracks, i.e., tracking errors are corrected.

Next, an objective lens 17 converges the three light beams reflected by the reflecting mirror 16a, thereby irradiating the three light beams on the respective target tracks on the recording medium 15. The objective lens 17 also acts as an element for transforming the light beams reflected from the target tracks on the recording medium 15 into the collimated light beams again. The reflected light beams passing through the objective lens 17 go along the same optical path as the light beams directed from the light source 11 toward the recording medium 15 backwardly, and then they are separated from the light beams from the light source 11 by the beam splitter 14.

The light beams from the beam splitter 14 are then incident on a Wollaston prism 18. The Wollaston prism 18 splits each of the three light beams into three beams having respectively different polarization directions. A spot lens 19 converges the collimated light beams, i.e., the light beams split by the Wollaston prism 18. A cylindrical lens 20 functions as a lens only in a single direction. This cylindrical lens 20 is used for detecting a focusing error signal by an astigmatic method.

Figure 2:
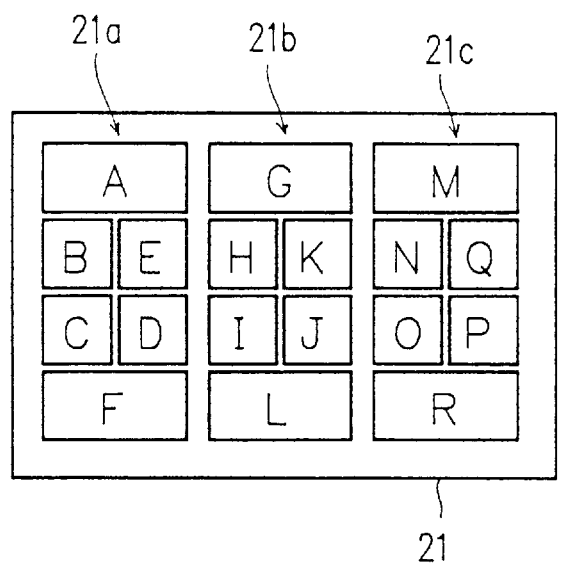
FIG. 2 is a view schematically showing a photodetecting surface of a photodetector of the multi-beam optical head shown in FIG. 1.

The light beams which passed through the cylindrical lens 20 are incident on a photodetector 21. The photodetector 21 includes three detecting elements 21a, 21b and 21c each of which is a six-divided light receiving element. As shown in FIG. 2, the detecting element 21a includes six photodetecting portions A to F; the detecting element 21b includes six photodetecting portions G to L; and the detecting element 21c includes six photodetecting portions M to R. These detecting elements 21a, 21b and 21c correspond respectively to the three light beams emitted from the light source 11.

These six-divided detecting devices 21a, 21b and 21c will be described in detail. For example, in the six divided detecting device 21a, the photodetecting portions A and F disposed in the upper and the lower sections are provided for detecting a data signal, while the photodetecting portions B to E disposed in the intermediate sections are provided for obtaining the control signals (servo signals) for a focusing servo control and a tracking servo control. The focusing error signal is generated by an astigmatic method using outputs from the photodetecting portions B to E. Based on the focusing error signal, the position of the objective lens 17 in the direction perpendicular to the recording medium 15 is controlled, so that the focal point of the objective lens 17 is precisely placed on the recording medium 15.

On the other hand, the tracking error signal is generated by a push-pull method. Based on this tracking error signal, not only by controlling the position of the objective lens 17 in a radial direction of the recording medium 15, but also by rotating the reflecting mirror 16a by a small angle determined by using the tracking error signal so as to control the rotation angle of the beam spot line, the respective beam spots are precisely placed on the predetermined tracks.

Hereinafter, the beam spot line rotatory controller 16 for controlling the rotation of the respective beam spot lines will be described in further detail.

Figure 3A:
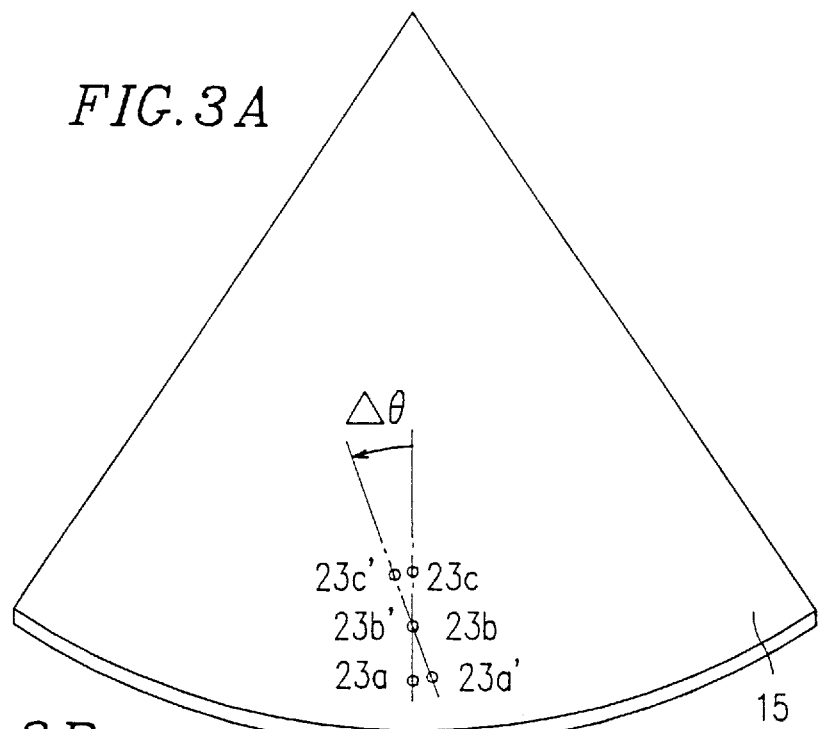
FIG. 3A is a plan view showing the rotation of a beam spot line on the recording surface of the recording medium.
Figure 3B:
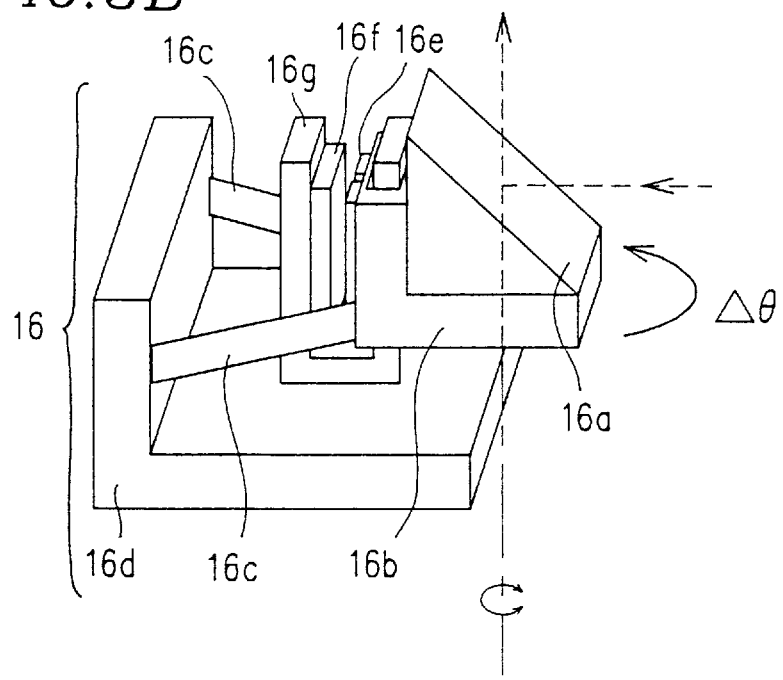
FIG. 3B is a perspective view showing a configuration of the beam spot line rotatory controller of the multi-beam optical head shown in FIG. 1.

FIG. 3A shows the rotation of the beam spot line due to the rotation of the reflecting mirror 16a. FIG. 3B is a perspective view of the beam spot line rotatory controller 16. As shown in FIG. 3B, the reflecting mirror 16a is fixed on a holder 16b. This holder 16b is fixed on one end of each of a pair of leaf springs 16c. The other end of each leaf spring 16c is fixed on an inner surface of a vertical wall of an L-shaped fixing member 16d so that the pair of leaf springs 16c are arranged in a V-shape. That is, the distance between the leaf springs 16c is larger at the fixing member 16d than at the holder 16b. The holder 16b is supported by the V-shaped springs 16c so as to rotate in a predetermined area around a holder rotation axis 22 formed at the intersection of the leaf springs 16c. This holder rotation axis 22 crosses the reflecting surface of the reflecting mirror 16a substantially at a position where the central one of the three beams emitted from the light source 11 is incident and is reflected. In other words, the holder rotation axis 22 coincides with the optical path of the central beam of the three beams after they are reflected by the reflecting mirror 16a.

A driving coil 16e is attached to a portion of the holder 16b, and is connected to a control section (not shown). A yoke 16g and a permanent magnet 16f attached thereon are provided on the fixing member 16d so as to face the driving coil 16e. The driving coil 16e, the permanent magnet 16f and the yoke 16g form a magnetic circuit. A driving current is supplied from the control section to the driving coil 16e. An electromagnetic driving force generated depending on the amount of the driving current causes the rotation of the reflecting mirror 16a around the holder rotation axis 22.

The operation of the beam spot line rotatory controller 16 having the above-mentioned configuration will be described below.

Figure 8:
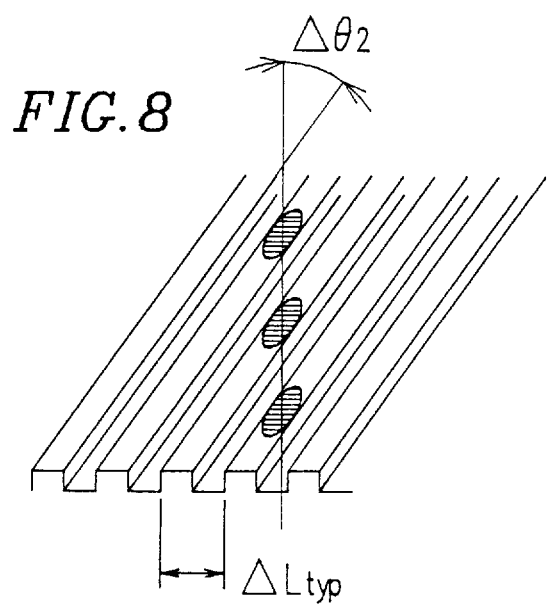
FIG. 8 is a perspective view showing the beam spots which are precisely positioned on the tracks adjacent to each other.
Figure 9A:
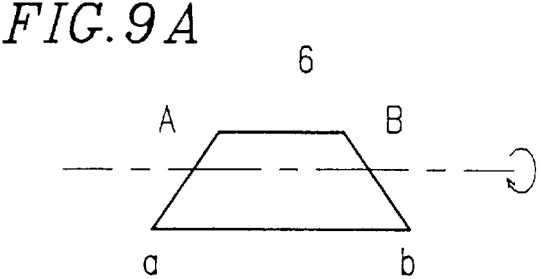
FIGS. 9A to 9D are schematic diagrams illustrating the reason why an image rotating prism is conventionally provided.
Figure 9B:
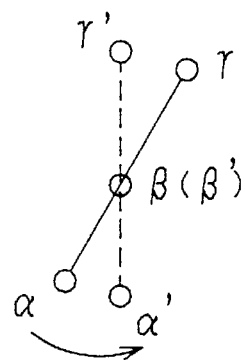
Figure 9C:
Figure 9D:
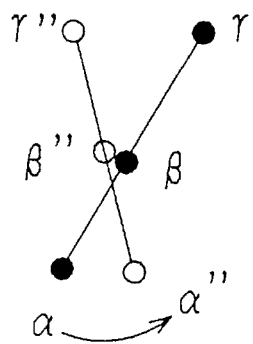

As shown in FIG. 8, a plurality of tracks on the recording medium 15 are formed so that the track pitch $\Delta L$ is set to be a reference pitch $\Delta L_{typ}$. An angle formed by a beam spot line with respect to a track tangent direction in the case where the respective beam spots are precisely positioned on the adjacent tracks is indicated by $\Delta \theta_2$.

Figure 7:
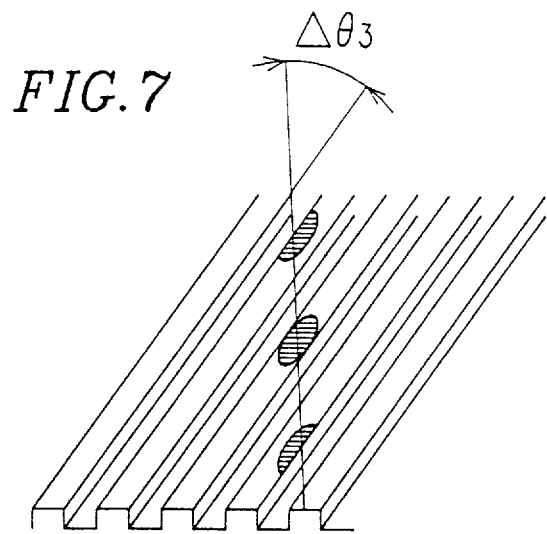
FIG. 7 is a perspective view showing the beam spots when the deviations of the beam spots from the tracks occur.

However, the curvature of the tracks are different from each other in the outer periphery and the inner periphery of the recording medium 15. In addition, when the recording medium 15 is exchanged, the track pitch $\Delta L$ becomes different from that of the previous recording medium 15 in some cases. In some cases, within one recording medium 15, some portions may have a different track pitch. Accordingly, if the angle of the beam spot line to be irradiated onto the respective tracks with respect to the track tangential direction is fixed, then deviations of the beam spots from the predetermined tracks, i.e., a tracking error of the beam spots occurs when the respective positions of the beam spots do not correspond to the predetermined tracks as shown in FIG. 7. As a result, the recording and reproducing characteristics of the data are disadvantageously degraded.

As shown in FIG. 7, an angle of the beam spot line when the deviations of the beam spots from the predetermined tracks occur is indicated by $\Delta \theta_3$. By rotating the reflecting mirror 16a, the angle of the beam spot line with respect to the track tangential direction can be changed from $\Delta \theta_3$ to $\Delta \theta_2$. Therefore, a rotation angle $\Delta \theta_1$ of the reflecting mirror 16a required for correcting the deviations of the beam spots from the tracks can be obtained as follows:

$$\Delta \theta_1 = \Delta \theta_3 - \Delta \theta_2$$

In order to perform this correction, the control section supplies the driving current to the driving coil 16e, serving as a driving portion, in response to a rotatory tracking error signal generated based on the outputs from the photodetector 21, so that the reflecting mirror 16a is rotated by the angle corresponding to $\Delta \theta_1$ in a direction required for precisely positioning the respective beam spots on the predetermined tracks.

Next, a method for obtaining the rotatory tracking error signal TE to be supplied to the beam spot line rotatory controller 16 will be described.

For example, by using signals generated based on the outer two beams of the three beams, the rotatory tracking error signal TE can be obtained. More specifically, a push-pull signal P1=(B+C)−(D+E) obtained from the outputs of the light receiving portions B to E of the photodetecting element 21a, and a push-pull signal P2=(N+O)−(P+Q) obtained from the outputs of the light receiving portions N to Q of the photodetecting element 21c are subjected to calculation for obtaining the rotatory tracking error signal TE. The rotatory tracking error signal TE is obtained by subtracting the push-pull signal P2 from the push-pull signal P1. That is, $TE=P_1-P_2$.

The driving current to be supplied to the driving coil 16e is then determined so that the value of the rotatory tracking error signal TE becomes zero. By supplying the driving current thus determined to the driving coil 16e, the reflecting mirror 16a is rotated around the holder rotation axis 22. As a result, the beam spot line including the beam spots 23a to 23c is rotated around the central beam spot 23b by an angle $\Delta\theta_1$ on the recording medium 15 as shown in FIG. 3A, so as to become a beam spot line including spots 23a' to 23c'.

Next, a method for driving the reflecting mirror 16a will be described.

Figure 5A:
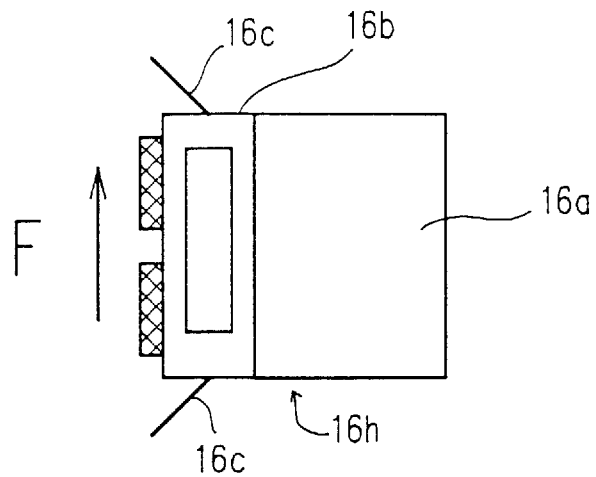
FIGS. 5A and 5B illustrate the operation of the reflecting mirror of the multi-beam optical head shown in FIG. 1.
Figure 5B:
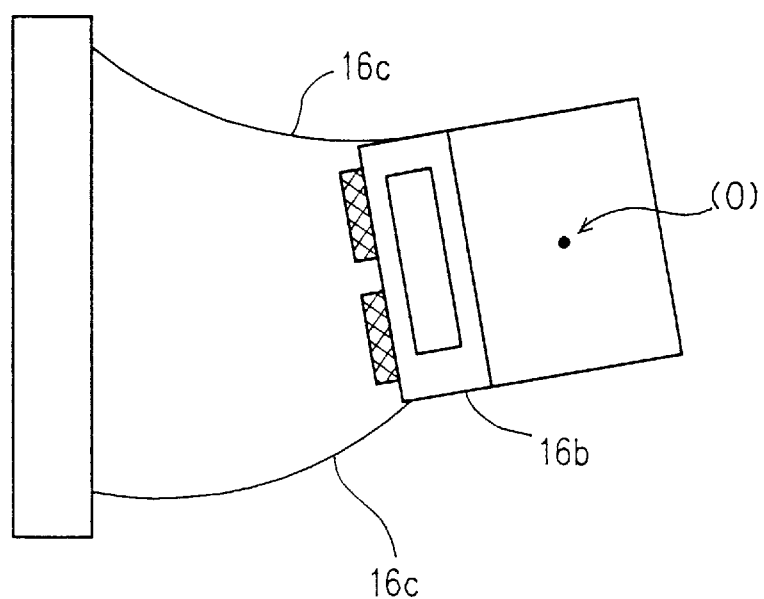
Figure 6:
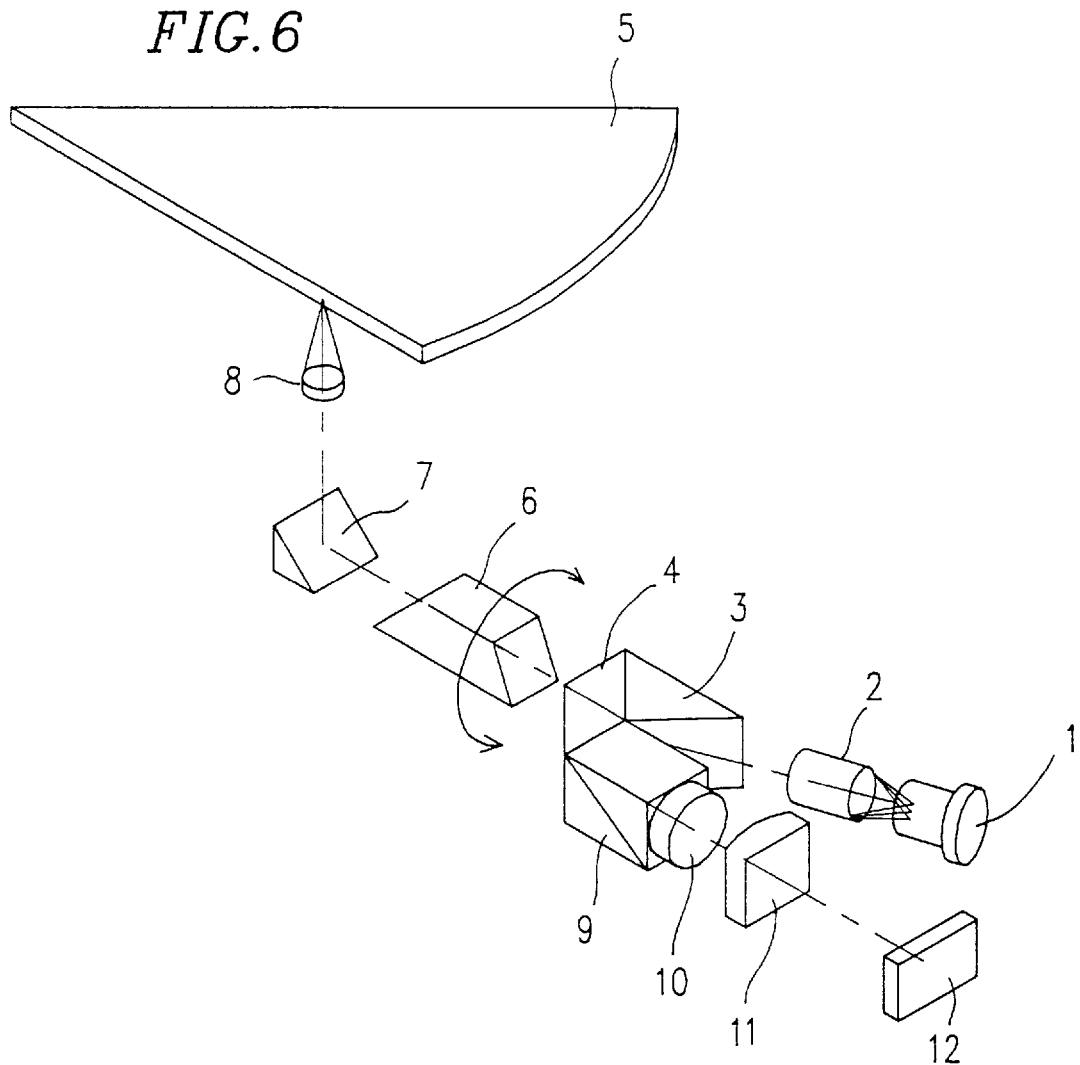
FIG. 6 is a perspective view schematically showing an optical arrangement for a conventional multi-beam optical head.

FIG. 4 is a plan view showing a top portion of the beam spot line rotatory controller 16 shown in FIG. 3. When a drive current is supplied to the driving coil 16e shown in FIG. 4, a driving force F is generated on a movable section 16h side as shown in FIG. 5A. Herein, the movable section 16h is a portion including the reflecting mirror 16a, the holder 16b and the driving coil 16e. The holder 16b is connected to the fixing portion 16d by the leaf springs 16c which are arranged in a V-shape. Therefore, even when the force F is generated on the movable section 16h, the holder 16b does not move in the direction parallel to the direction of the force F because of the leaf springs 16c. Instead, the leaf springs 16c are bent as shown in FIG. 5B. As a result, the reflecting mirror 16a is rotated substantially around a point O at which the central one of the three beams crosses the reflecting surface of the reflecting mirror 16a. The maximal rotation amount of the reflecting mirror 16a is set to be about ±1 degree in view of the assembly precision of the beam spot line rotatory controller 16.

As described above, a multi-beam optical head according to the present invention includes a light source 11 provided with a plurality of light-emitting devices; a collimator lens 12 for collimating the respective light beams emitted from the light source 11; a beam splitter 14 for separating the light beams to be irradiated onto the recording medium 15 from the light beam reflected by the recording medium 15; and an objective lens 17 for converging the collimated light beams onto the recording medium 15 and for collimating the light beam reflected by the recording medium 15 again. The multi-beam optical head also includes the beam spot line rotatory controller 16 for rotating the reflecting mirror 16a around an axis perpendicular to the recording surface of the recording medium 15 in accordance with the outputs of the photodetector 21. This beam spot line rotatory controller 16 is disposed between the beam splitter 14 and the objective lens 17. Consequently, as the reflecting mirror 16a is rotated, the beam spot line including the beam spots is rotated around the central beam spot thereof. In this way, even in the case where deviations of the beam spots from the predetermined tracks occur, the deviations can be corrected by the rotation of the beam spot line, so that the beam spots are precisely positioned on the predetermined tracks, as shown in FIG. 8. Accordingly, it becomes possible to precisely converge a plurality of light beams on the predetermined tracks on the recording medium 15. In a state where the positions of the beam spots are controlled to be precisely positioned on the predetermined tracks, information is precisely recorded on or reproduced from a plurality of tracks in parallel by using the light beams. As apparent from the above description, according to the present invention, in order to rotate the beam spot line, it is no longer necessary to use an image rotatory prism which has conventionally been required. Therefore, it is possible to provide a multi-beam optical head having a reduced weight at a lower cost.

In this example, the reflecting mirror 16a is rotated by means of the leaf springs 16c and the magnetic circuit including the magnet attached to the yoke and the driving coil 16e, as shown in FIG. 3. However, the construction of the rotatory controller is not limited to this construction. Any mechanism can be used so long as the mechanism controls the reflecting mirror 16a to be rotated around an axis which is perpendicular to the recording surface of the recording medium 15 and which coincides with the central one of the light beams reflected by the reflecting mirror 16a.

Moreover, in this example, a triangular mirror having a side inclined at 45 degrees as the reflection plane as shown in FIG. 3 is used as the reflecting mirror 16a. The angle at which the reflecting surface of the mirror 16a is inclined and the shape of the mirror 16a are not limited thereto. For example, a plate-like mirror the surfaces of which are in parallel to each other, a polygonal mirror using a side of a polygon as the reflection surface or the like may also be used. Any mirror may be used so long as it can reflect the light beams.

Further, in this example, a light source emitting three light beams is used as the light source 11. The present invention is applicable to any optical head using a light source emitting at least three light beams, e.g., five light beams.

As described above, according to a multi-beam optical head of the invention, by providing a reflecting mirror which is controlled to be rotated, a tracking error, i.e., deviations of beam spots from predetermined tracks can be corrected, resulting in precisely positioning a plurality of beam spots on the predetermined tracks. Consequently, it is no longer necessary to use an image rotating prism which has conventionally been required for rotating the beam spot line including the beam spots with respect to the predetermined tracks. Therefore, the weight of the multi-beam optical head can be reduced. Also, it becomes possible to provide the multi-beam optical head at a reduced cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A multi-beam optical head comprising:

a plurality of light sources for emitting a plurality of light beams;

an optical system for irradiating the plurality of light beams onto a recording surface of a recording medium and for receiving the plurality of light beams reflected from the recording medium, the optical system including a reflecting mirror for directing the plurality of light beams emitted from the light sources toward the recording medium;

light detecting means for detecting the plurality of light beams received by the optical system and for generating electric signals based on the detected light beams; and rotational control means for controlling the reflecting mirror to rotate around an axis which is perpendicular to the recording surface by an amount determined based on the electric signals such that the reflecting mirror positions each of the plurality of light beams on a different respective one of a plurality of tracks on the recording surface of the recording medium, the tracks being tracks on which information is recorded or from which the information is reproduced.

2. A multi-beam optical head according to claim 1, wherein the axis around which the reflecting mirror rotates coincides with a center axis of a light bundle including the light beams.

3. A multi-beam optical head according to claim 1, wherein the rotational control means includes:

a fixing member;

a pair of leaf springs for fixing the reflecting mirror to the fixing member, one end of each of the leaf springs being connected to the reflecting mirror while the other end of the each of the leaf springs is connected to the fixing member, a distance between the leaf springs being narrower at one end than at the other end; and a driving section for generating a force to rotate the reflecting mirror.

4. A multi-beam optical head according to claim 1, wherein the rotation of the reflecting mirror around the axis causes rotational movement of the light beams relative to a plane of the recording surface.

* * * * *